United States Patent
Lai

(10) Patent No.: US 8,825,933 B2
(45) Date of Patent: Sep. 2, 2014

(54) BUS APPARATUS WITH DEFAULT SPECULATIVE TRANSACTIONS AND NON-SPECULATIVE EXTENSION

(75) Inventor: Chi-Chang Lai, Hsinchu County (TW)

(73) Assignee: Andes Technology Corporation, Hsin-Chu (TW)

( * ) Notice: Subject to any disclaimer, the term of this patent is extended or adjusted under 35 U.S.C. 154(b) by 309 days.

(21) Appl. No.: 13/307,007

(22) Filed: Nov. 30, 2011

(65) Prior Publication Data
US 2013/0138847 A1    May 30, 2013

(51) Int. Cl.
*G06F 13/00*    (2006.01)
(52) U.S. Cl.
USPC ........................................................ 710/110
(58) Field of Classification Search
CPC .. G06F 13/364; G06F 13/385; G06F 13/4027
USPC .................................. 710/104–119, 305–309
See application file for complete search history.

(56) References Cited

U.S. PATENT DOCUMENTS

| | | | |
|---|---|---|---|
| 5,717,931 A | 2/1998 | Sapir et al. | |
| 5,864,692 A | 1/1999 | Faraboschi et al. | |
| 6,654,860 B1 | 11/2003 | Strongin et al. | |
| 6,665,757 B1 * | 12/2003 | Tsujita et al. | 710/110 |
| 6,772,254 B2 * | 8/2004 | Hofmann et al. | 710/110 |
| 2007/0294487 A1 | 12/2007 | Mino et al. | |

* cited by examiner

*Primary Examiner* — Raymond Phan
(74) *Attorney, Agent, or Firm* — Jianq Chyun IP Office

(57) ABSTRACT

A bus apparatus is provided, which includes a bus master and a bus slave coupled to the bus master through a bus interface. When the bus master sends a bus transaction to the bus slave, the bus slave executes the bus transaction. The bus transaction is speculative by default. The command of the bus transaction indicates whether the bus transaction is a write transaction or a read transaction. When the bus transaction is a write transaction, the bus slave stores the write data of the bus transaction at the address of the bus transaction. When the bus transaction is a read transaction, the bus slave responds the bus transaction with a read data stored at the address of the bus transaction. The bus slave informs the bus master that the bus slave will not recognize further bus transactions in a specific period of time by asserting a bus wait signal.

16 Claims, 18 Drawing Sheets

BUS APPARATUS WITH DEFAULT SPECULATIVE TRANSACTIONS AND NON-SPECULATIVE EXTENSION

BACKGROUND OF THE INVENTION

1. Field of the Invention

The present invention relates to a bus apparatus. More particularly, the present invention relates to a bus apparatus supporting default speculative bus transactions and non-speculative (NS) extension.

2. Description of the Related Art

A bus transaction is a transaction flown from a bus master to a bus slave to carry data from master to slave (a write transaction), or to inquire data back to a master from a slave (a read transaction). The bus master is usually a data processing engine (DPE) such as a microprocessor that fetches, decodes, and executes instructions. The bus slave is usually a storage device such as a physical memory. Since the processing throughput of a DPE is never high enough, many pipelined DPEs support speculative instruction fetching for higher throughput. When such a DPE fetches a branch instruction, the DPE predicts a target address of the branch instruction and then fetches instructions at the target address to feed the pipeline instead of idly waiting for the confirmation of the target address. When the DPE finds out the prediction is incorrect later, the DPE simply flushes its pipeline to get rid of the mis-fetched instructions. When the prediction is correct, the DPE saves time because the instructions are already in the pipeline. Similarly, there are speculative bus transactions for speeding up a bus system.

A bus master may have multiple bus interfaces connecting to different peripheral devices, i.e., bus slaves. Each bus interface may be mapped to a different address space. For such a bus master, there are three conditions for committing an instruction to issue a corresponding bus transaction. The first condition is the execution of the instruction, which means the instruction is not flushed or cancelled. The second condition is the completion of the translation from the address of the instruction to the address space corresponding to one of the bus interfaces. The third condition is the permissions at the address of the instruction allow the access of the instruction. In a non-speculative bus system, a bus master sends a transaction to a bus slave only when the aforementioned three conditions for the corresponding instruction are all satisfied.

On the other hand, in a speculative bus system, a bus master may send a transaction to a bus slave before fully satisfying the aforementioned three conditions as long as the bus master somehow predicts or guesses that the instruction is likely to be committed to generate the aforementioned bus transaction to the bus slave. Such bus transactions are speculative bus transactions. When the bus master finds out later that the instruction is to be aborted, the corresponding speculative bus transaction is also aborted by discarding the data to be written to the bus slave or the data read from the bus slave. When the instruction is to be committed, a speculative bus transaction is always faster than a non-speculative bus transaction because the speculative bus transaction is issued earlier.

SUMMARY OF THE INVENTION

Accordingly, the present invention is directed to a bus apparatus that supports both speculative and non-speculative bus transactions. This bus apparatus use an aggressive and efficient bus protocol to improve the performance of the bus system.

The present invention is also directed to a bus apparatus including an arbiter and multiple bus masters. This bus apparatus can solve the conflict of bus transactions conforming to the aforementioned bus protocol from multiple bus masters using an extension to the aforementioned bus protocol.

According to an embodiment of the present invention, a bus apparatus is provided. The bus apparatus includes a bus master and a bus slave coupled to the bus master through a bus interface. When the bus master sends a bus transaction to the bus slave, the bus slave executes the bus transaction. The bus transaction is speculative by default. The command of the bus transaction indicates whether the bus transaction is a write transaction or a read transaction. When the bus transaction is a write transaction, the bus slave stores the write data of the bus transaction at the address of the bus transaction. When the bus transaction is a read transaction, the bus slave responds the bus transaction with a read data stored at the address of the bus transaction. The bus slave informs the bus master that the bus slave will not recognize further bus transactions in a specific period of time by asserting a bus wait signal.

According to another embodiment of the present invention, another bus apparatus is provided. The bus apparatus includes an arbiter, a first bus master coupled to the arbiter through a first bus interface, a second bus master coupled to the arbiter through a second bus interface, and a bus slave coupled to the arbiter through a third bus interface. For each bus master of the first and the second bus masters, when the bus master issues a bus transaction, the arbiter forwards the bus transaction to the bus slave and the bus slave executes the bus transaction. The bus transaction is speculative by default. The command of the bus transaction indicates whether the bus transaction is a write transaction or a read transaction.

When the bus transaction is a write transaction, the bus slave stores the write data of the bus transaction at the address of the bus transaction. When the bus transaction is a read transaction, the bus slave responds the bus transaction with a read data stored at the address of the bus transaction and the arbiter forwards the read data to the bus master.

The arbiter transmits a static wait state signal to the bus master. The static wait state signal determines the length of time the bus master holds the command and the address of the bus transaction unchanged for the bus slave to receive the command and the address. When the bus transaction is a write transaction, the bus master also holds the write data of the bus transaction unchanged for the bus slave to receive the write data according to the length of time.

In an embodiment of the present invention, the length of time determined by the static wait state signal of the second bus master is longer than the length of time determined by the static wait state signal of the first bus master by default. The arbiter forwards the bus transaction of the first bus master to the bus slave immediately without delay, while the arbiter forwards the bus transaction of the second bus master to the bus slave with a predetermined delay.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
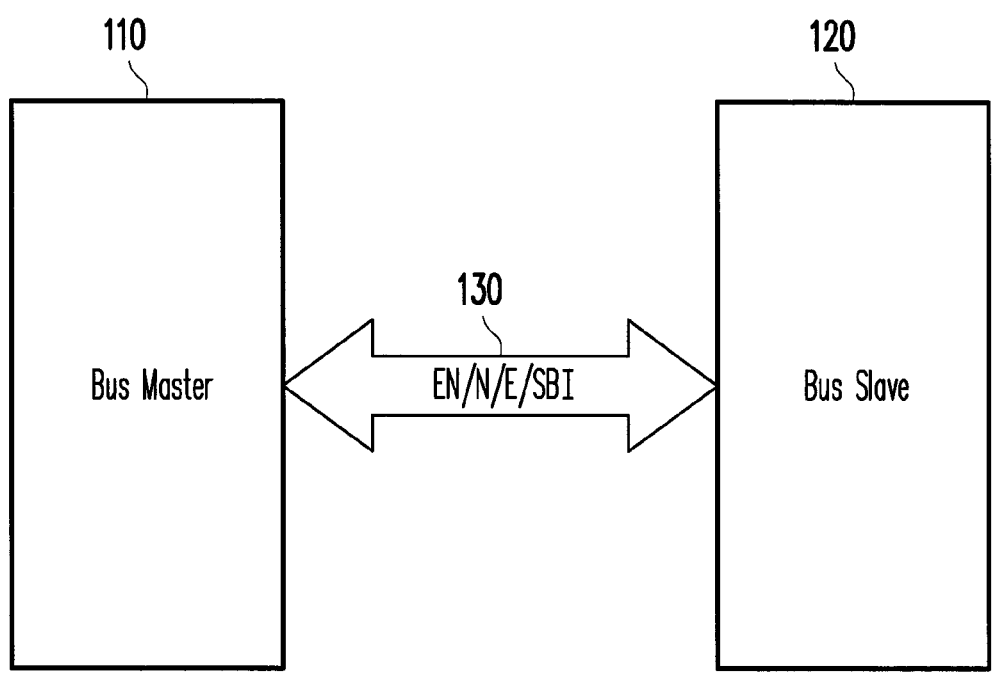
FIG. 1 is a schematic diagram showing a bus apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a bus apparatus 100 according to an embodiment of the present invention. The bus apparatus 100 includes a bus master 110 and a bus slave 120. The bus master 110 may be a DPE such as a microprocessor. The bus slave 120 may be a hardware storage device such as a memory. The bus master 110 and the bus slave 120 are coupled to each other through the bus interface 130. The bus interface 130 may be the Speculative Bus Interface (SBI) 230 shown in FIG. 2, the Extended Speculative Bus Interface (ESBI) 530 shown in FIG. 5, the Non-speculative/Speculative Bus Interface (NSBI) 930 shown in FIG. 9, or the Extended Non-speculative/Speculative Bus Interface (ENSBI) 1330 shown in FIG. 13. These bus interfaces are discussed in details below. Although only one bus slave is shown in FIG. 1, the bus interface 130 may be used to connect more than one bus slave. In the following embodiments of the present invention, there is only one bus slave for simplicity.

The bus master 110 may send bus transactions to the bus slave 120. The bus slave 120 executes the bus transactions by consuming associated data or returning data to the bus master 110. All bus transactions in this embodiment are speculative by default. Each bus transaction is induced by some internal operation of the bus master 110. For example, a read transaction issued by the bus master 110 may be induced by a load instruction executed inside the bus master 110, while a write transaction issued by the bus master 110 may be induced by a store instruction executed inside the bus master 110. One internal operation of the bus master 110 may induce zero or more bus transactions.

The same internal operation of the bus master 110 may issue its corresponding bus transactions multiple times. At most one of these replicated bus transactions is significant to the internal operation, while others are speculative. The significant bus transaction for the internal operation, if it exists, is the last one in the replication of the same transaction. Only the significant bus transaction is committed, while the other replicated bus transactions are cancelled or aborted. Such a bus master processes its internal operation speculatively too; that is, its internal operation will not be confirmed until a final stage of the internal processing of the bus master has been reached. Before reaching the final stage, an internal operation may be canceled and all what has been done for that internal operation internally or externally does not affect the next non-canceled internal operation. A typical example of such a bus master is a pipelined microprocessor.

For better efficiency once the bus master 110 has sent out a bus transaction, the bus slave 120 cannot ask the bus master 110 to retry the bus transaction later on. The bus slave 120 has no knowledge about the replication of bus transactions for one internal operation of the bus master 110. In other words, when the bus slave 120 receives a bus transaction from the bus master 110, the bus slave 120 does not know which internal operation of the bus master 110 induces the bus transaction. Moreover, the bus slave 120 does not know whether the internal operation that inducing the bus transaction will be confirmed or cancelled. The bus slave 120 has to execute each bus transaction equally. Therefore, the bus slave 120 has to tolerate speculative bus transactions, which means the resulting state of the bus slave 120 is the same no matter how many times an element, such as a register, of the bus slave 120 is accessed by the same bus transaction.

Figure 2:
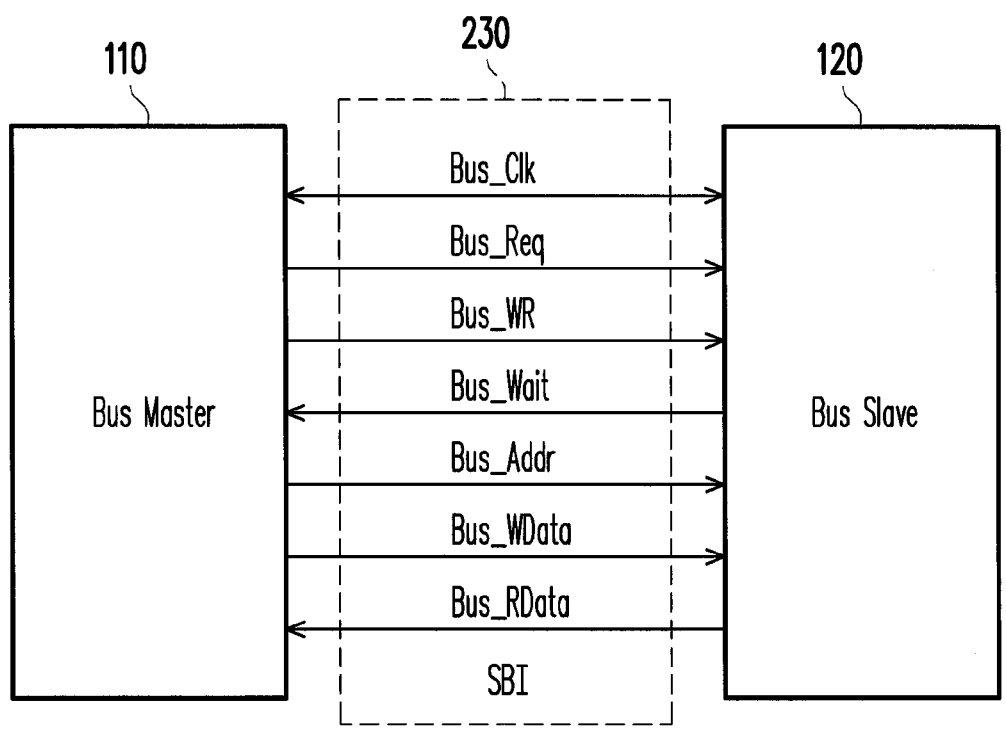
FIG. 2 is a schematic diagram showing a bus apparatus with a Speculative Bus Interface (SBI) according to an embodiment of the present invention.

FIG. 2 is a schematic diagram showing a bus apparatus 200 with an SBI 230 according to an embodiment of the present invention. The bus apparatus 200 includes the bus master 110 and the bus slave 120. The bus master 110 and the bus slave 120 are coupled to each other through the SBI 230. Each of the bus master 110 and the bus slave 120 receives the bus clock signal Bus_Clk. The bus clock signal Bus_Clk controls the timing of all bus transactions. The bus master 110 transmits the bus request signal Bus_Req, the bus command signal Bus_WR, the bus address signal Bus_Addr, and the bus write data signal Bus_WData to the bus slave 120 through the SBI 230. The bus slave 120 transmits the bus wait signal Bus_Wait and the bus read data signal Bus_RData to the bus master 110 through the SBI 230. The SBI 230 is a hardware interface including multiple signal paths for transmitting the aforementioned bus signals between the bus master 110 and the bus slave 120.

When the bus master 110 has a bus transaction for the bus slave 120 to execute, the bus master 110 asserts the bus request signal Bus_Req and includes the command of the bus transaction in the bus command signal Bus_WR to indicate whether the bus transaction is a write transaction or a read transaction. In this embodiment, an asserted state of the bus command signal Bus_WR represents a write command, while a de-asserted state of the bus command signal Bus_WR represents a read command. When the bus transaction is a write transaction, the bus master 110 includes the address of the bus transaction in the bus address signal Bus_Addr and includes the write data of the bus transaction in the bus write data signal Bus_WData. In response, the bus slave 120 stores the write data of the bus transaction at the address of the bus transaction. When the bus transaction is a read transaction, the bus master 110 includes the address of the bus transaction in the bus address signal Bus_Addr. The bus slave 120 responds the read transaction by including a read data stored at the address of the bus transaction in the bus read data signal Bus_RData and transmits the bus read data signal Bus_RData to the bus master 110.

The bus slave 120 informs the bus master 110 that the bus slave 120 will not recognize further bus transactions in a specific period of time by asserting the bus wait signal Bus_Wait. For example, the specific period of time may begin at the next cycle of the bus clock signal Bus_Clk after the bus slave 120 asserts the bus wait signal Bus_Wait and end at the cycle of the bus clock signal Bus_Clk in which the bus slave 120 de-asserts the bus wait signal Bus_Wait. When a bus transaction takes a longer period of time to finish, the bus slave 120 may assert the bus wait signal Bus_Wait to indicate that the bus slave 120 is busy with the current bus transaction and is not yet ready to receive the next transaction.

Figure 3:
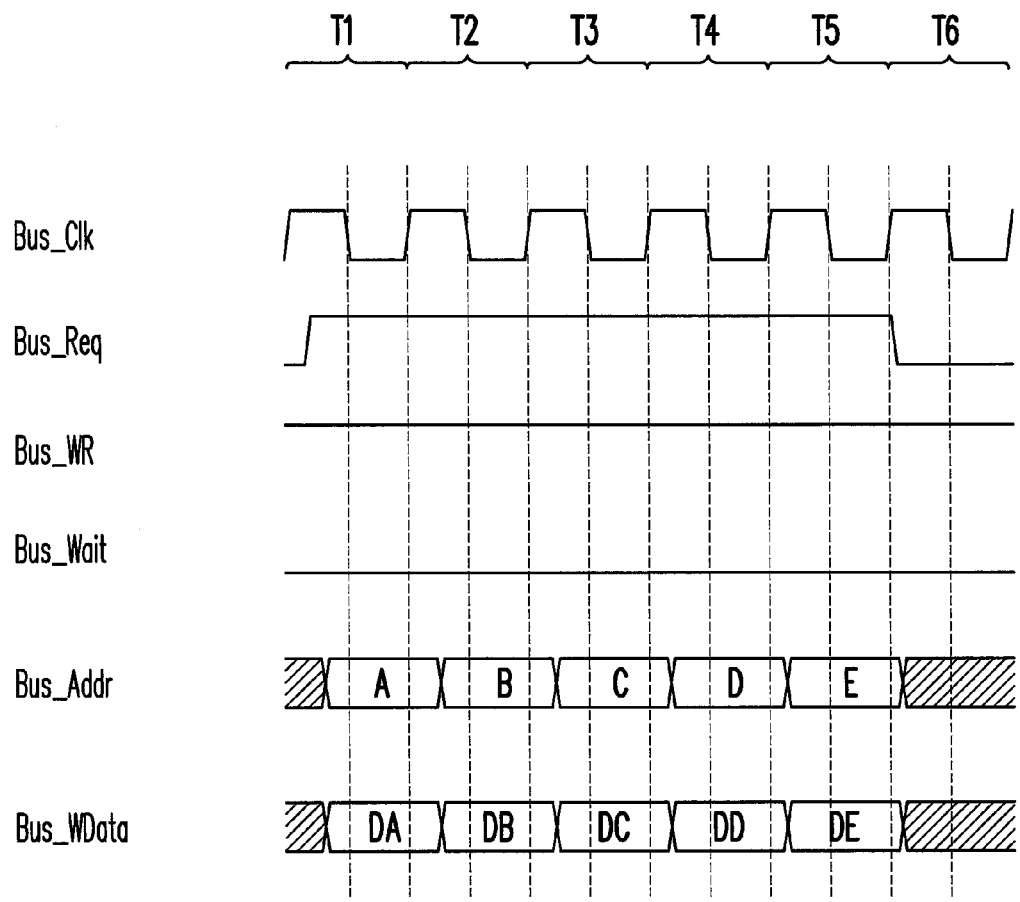
FIG. 3 and FIG. 4 are schematic diagrams showing signal waveforms in the bus apparatus shown in FIG. 2.

FIG. 3 is a schematic diagram showing the bus signals in the bus apparatus 200 during a series of five write transactions according to an embodiment of the present invention. T1 represents the first cycle of the bus clock signal Bus_Clk (i.e., the first clock cycle), T2 represents the second cycle of the bus clock signal Bus_Clk (i.e., the second clock cycle), and so on. A, B, C, D and E are the addresses of the first, second, third, fourth and fifth write transactions, respectively. Similarly, DA, DB, DC, DD and DE are the write data of the first, second, third, fourth and fifth write transactions, respectively. Each write transaction takes a clock cycle.

Figure 4:
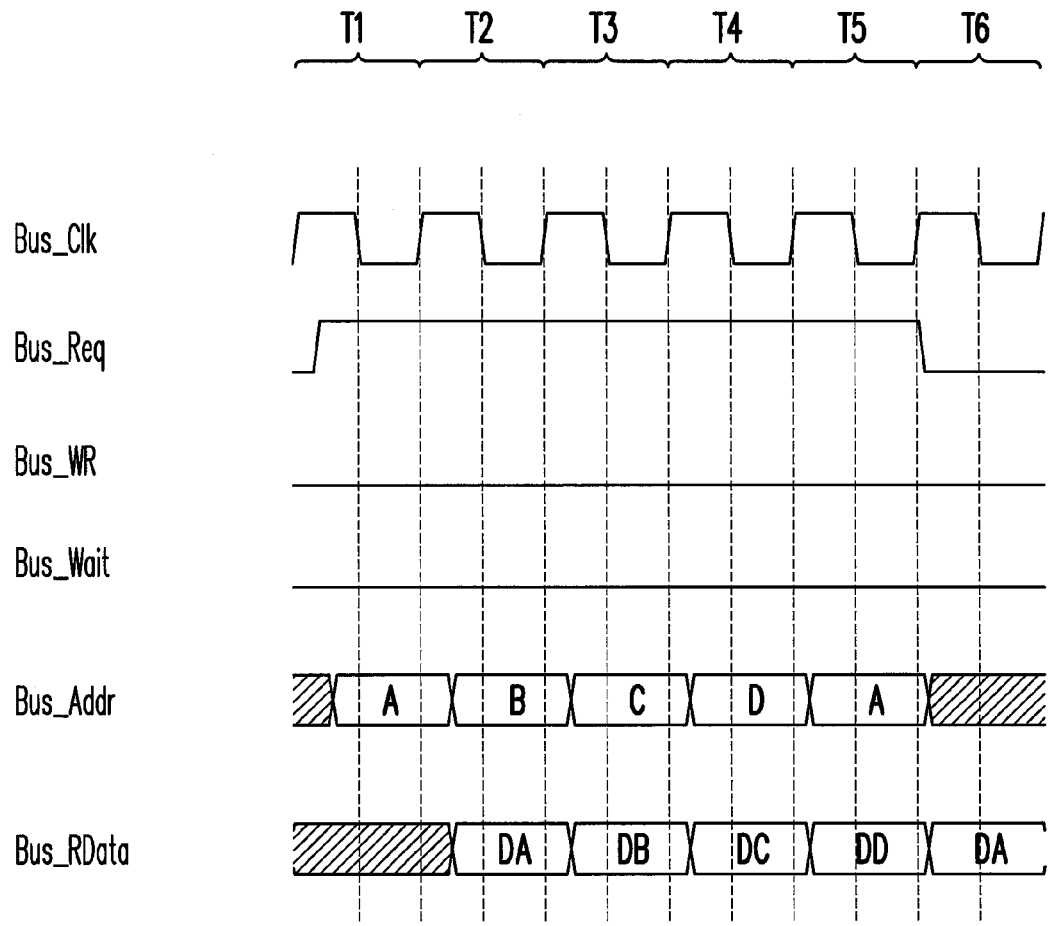

FIG. 4 is a schematic diagram showing the bus signals in the bus apparatus 200 during a series of five read transactions according to an embodiment of the present invention. A, B, C, D and E are the addresses of the first, second, third, fourth and fifth read transactions, respectively. Similarly, DA, DB, DC, DD and DE are the read data of the first, second, third, fourth and fifth read transactions, respectively. In fact, the first and the fifth transactions are replications corresponding to the same internal operation of the bus master 110. The internal operation inducing the first read transaction is cancelled eventually though its associated bus transaction is completed by the slave 120. The internal operation inducing the fifth read transaction is committed. In a speculative bus system such as the bus apparatus 200, repeated speculative read transactions should always get the same result unless the data is modified by other write transactions in between.

Figure 5:
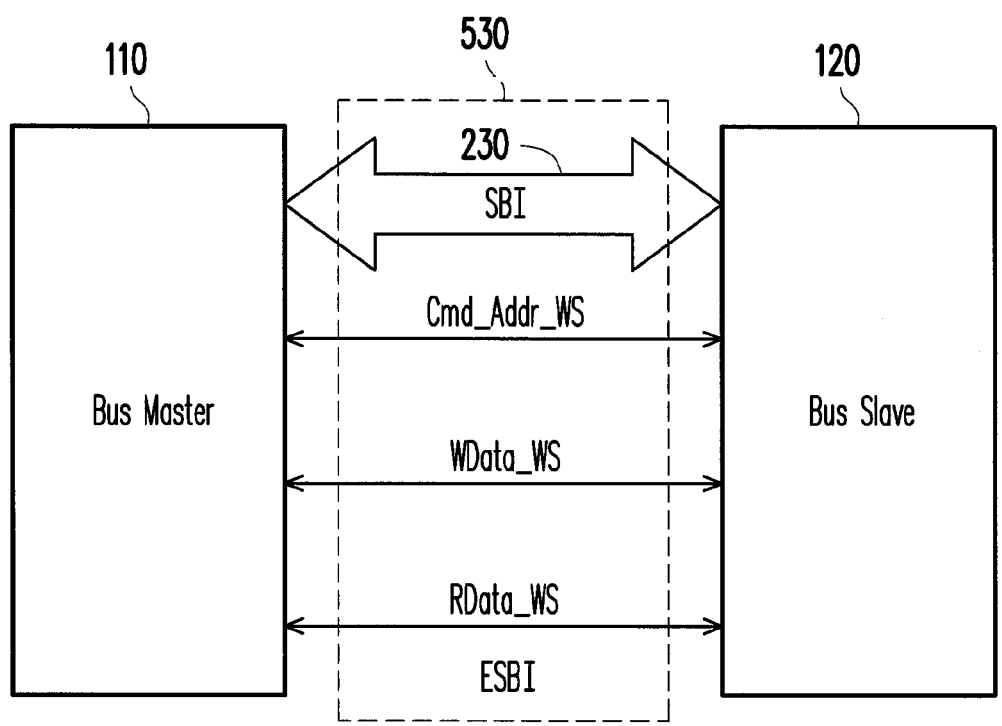
FIG. 5 is a schematic diagram showing a bus apparatus with an Extended Speculative Bus Interface (ESBI) according to an embodiment of the present invention.

FIG. 5 is a schematic diagram showing a bus apparatus 500 with an ESBI 530 according to an embodiment of the present invention. The bus apparatus 500 includes the bus master 110 and the bus slave 120. The bus master 110 and the bus slave 120 are coupled to each other through the ESBI 530. The ESBI 530 includes the SBI 230 and all of the bus signals shown in FIG. 2. Moreover, each of the bus master 110 and the bus slave 120 receive a static command/address wait state signal Cmd_Addr_WS, a static write data wait state signal WData_WS, and a static read data wait state signal RData_WS from the ESBI 530.

The static command/address wait state signal Cmd_Addr_WS determines the length of time the bus master 110 holds the command Bus_WR and the address Bus_Addr of the bus transaction unchanged for the bus slave 120 to receive the command and the address. The static write data wait state signal WData_WS determines the length of time the bus master 110 holds the write data Bus_WData of the bus transaction unchanged for the bus slave 120 to receive the write data. The static read data wait state signal RData_WS determines the length of time the bus slave 120 takes to respond a read transaction with the read data Bus_RData. The bus master 110 should expect to get the read data back later according to the static read data wait state signal RData_WS. All of the aforementioned three static wait state signals are static. In other words, none of the static command/address wait state signal Cmd_Addr_WS, the static write data wait state signal WData_WS, and the static read data wait state signal RData_WS is to be changed during the period of a bus transaction.

In this embodiment, the static command/address wait state signal Cmd_Addr_WS extends the length of time the bus master 110 holds the command Bus_WR and the address Bus_Addr of the bus transaction unchanged by a number of cycles of the bus clock signal Bus_Clk equal to the value of the static command/address wait state signal Cmd_Addr_WS. For example, FIG. 3 shows the default situation in which the value of Cmd_Addr_WS is zero. The bus master 110 holds the command Bus_WR and the address Bus_Addr of each bus transaction unchanged for one clock cycle. When the value of Cmd_Addr_WS is one, the bus master 110 holds the command Bus_WR and the address Bus_Addr of each bus transaction unchanged for two clock cycles. When the value of Cmd_Addr_WS is two, the bus master 110 holds the command Bus_WR and the address Bus_Addr of each bus transaction unchanged for three clock cycles, and so on.

In this embodiment, the static write data wait state signal WData_WS extends the length of time the bus master 110 holds the write data Bus_WData of the bus transaction unchanged by a number of cycles of the bus clock signal Bus_Clk equal to the value of the static write data wait state signal WData_WS. For example, FIG. 3 shows the default situation in which the value of WData_WS is zero. The bus master 110 holds the write data Bus_WData of each bus transaction unchanged for one clock cycle. When the value of WData_WS is one, the bus master 110 holds the write data Bus_WData of each bus transaction unchanged for two clock cycles. When the value of WData_WS is two, the bus master 110 holds the write data Bus_WData of each bus transaction unchanged for three clock cycles, and so on.

In this embodiment, the static read data wait state signal RData_WS extends the length of time the bus slave 120 takes to respond a read transaction with the read data Bus_RData by a number of cycles of the bus clock signal Bus_Clk equal to the value of the static read data wait state signal RData_WS. For example, FIG. 4 shows the default situation in which the value of RData_WS is zero. The bus slave 120 takes a clock cycle to respond a read transaction with the read data Bus_RData. When the value of RData_WS is one, the bus slave 120 takes one more clock cycle to respond a read transaction with the read data Bus_RData. When the value of RData_WS is two, the bus slave 120 takes two more clock cycles to respond a read transaction with the read data Bus_RData, and so on.

The static command/address wait state signal Cmd_Addr_WS, the static write data wait state signal WData_WS, and the static read data wait state signal RData_WS may be three separate signals. Alternatively, Cmd_Addr_WS, WData_WS and RData_WS may be unified into a single static wait state signal Static_WS, which are shown in some of the following figures.

In this embodiment, the bus slave 120 further transmits at least one of a dynamic command/address wait state signal, a dynamic write data wait state signal, and a dynamic read data wait state signal through the bus interface 530 to the bus master 110. The term "dynamic" means these dynamic wait state signals are meant to be changed during a bus transaction to further extend the length of time extended by their corresponding static wait state signals.

When the bus slave 120 asserts the dynamic command/address wait state signal in the length of time the bus master 110 holds the command Bus_WR and the address Bus_Addr of the bus transaction unchanged for the bus slave 120 to receive the command Bus_WR and the address Bus_Addr, the length of time the bus master 110 holds the command Bus_WR and the address Bus_Addr of the bus transaction unchanged is further extended according to the time when the bus slave 120 de-asserts the dynamic command/address wait state signal. In this embodiment, the length of time the bus master 110 holds the command Bus_WR and the address Bus_Addr of the bus transaction unchanged is further extended until a cycle of the bus clock signal Bus_Clk in which the bus slave 120 de-asserts the dynamic command/ address wait state signal.

When the bus slave 120 asserts the dynamic write data wait state signal in the length of time the bus master 110 holds the write data Bus_WData of the bus transaction unchanged for the bus slave 120 to receive the write data Bus_WData, the length of time the bus master 110 holds the write data Bus_WData of the bus transaction unchanged is further extended according to the time when the bus slave 120 de-asserts the dynamic write data wait state signal. In this embodiment, the length of time the bus master 110 holds the write data Bus_WData of the bus transaction unchanged is further extended until the cycle of the bus clock signal Bus_Clk in which the bus slave 120 de-asserts the dynamic write data wait state signal.

When the bus slave 120 asserts the dynamic read data wait state signal in the length of time the bus slave 120 takes to respond a read transaction with the read data Bus_RData, the length of time the bus slave 120 takes to respond the read transaction with the read data Bus_RData is further extended according to the time when the bus slave 120 de-asserts the dynamic read data wait state signal. In this embodiment, the length of time the bus slave 120 takes to respond the read transaction with the read data Bus_RData is further extended until the cycle of the bus clock signal Bus_Clk in which the bus slave 120 de-asserts the dynamic read data wait state signal.

The dynamic command/address wait state signal, the dynamic write data wait state signal, and the dynamic read data wait state signal may be three separate signals. Alternatively, these three signals may be unified into a single dynamic wait state signal. In this embodiment, the three dynamic wait state signals are unified with the bus wait signal Bus_Wait shown in FIG. 2.

Figure 6:
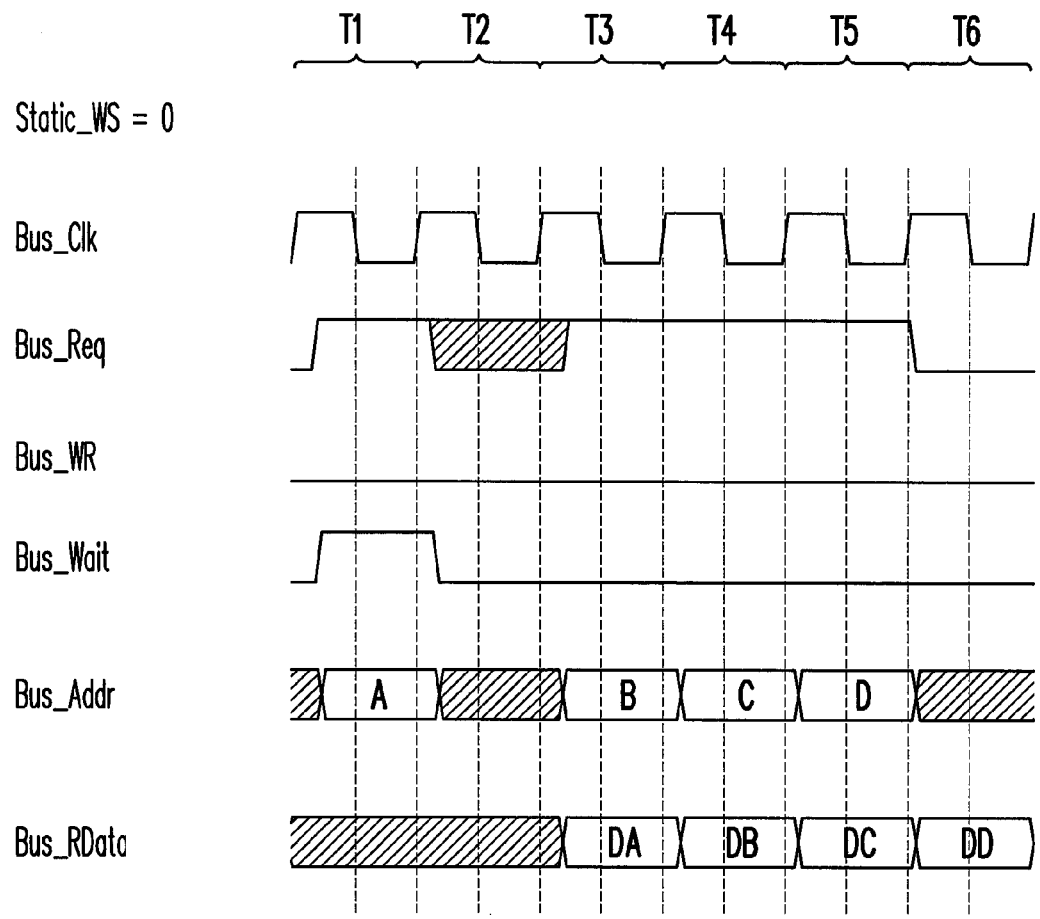
FIG. 6, FIG. 7 and FIG. 8 are schematic diagrams showing signal waveforms in the bus apparatus shown in FIG. 5.

FIG. 6 is a schematic diagram showing signal waveforms in the bus apparatus 500 according to an embodiment of the present invention. There are four read transactions in FIG. 6 with addresses A, B, C and D, respectively. So the four read transactions are called A, B, C and D hereinafter. The read data DA, DB, DC and DD are output by the bus slave 120 in response to the transactions A, B, C and D, respectively. In this embodiment, the value of the static wait state signal Static_WS is zero. Therefore the aforementioned lengths of time regarding a bus transaction are not extended. The bus slave 120 asserts the bus wait signal Bus_Wait in the clock cycle T1 and then de-asserts the bus wait signal Bus_Wait in the clock cycle T2, which means the bus slave 120 does not recognize bus transactions issued in T2. In response, the bus master 110 postpones the next bus transactions to T3. Moreover, the asserted bus wait signal Bus_Wait extends the length of time the bus slave 120 takes to respond the read transaction A by one clock cycle so that the bus slave 120 returns the data DA in the clock cycle T3 instead of the clock cycle T2. The bus slave 120 does not assert Bus_Wait for the bus transactions B, C and D. Therefore, the bus transactions B, C and D are not influenced by the bus wait signal Bus_Wait.

Figure 7:
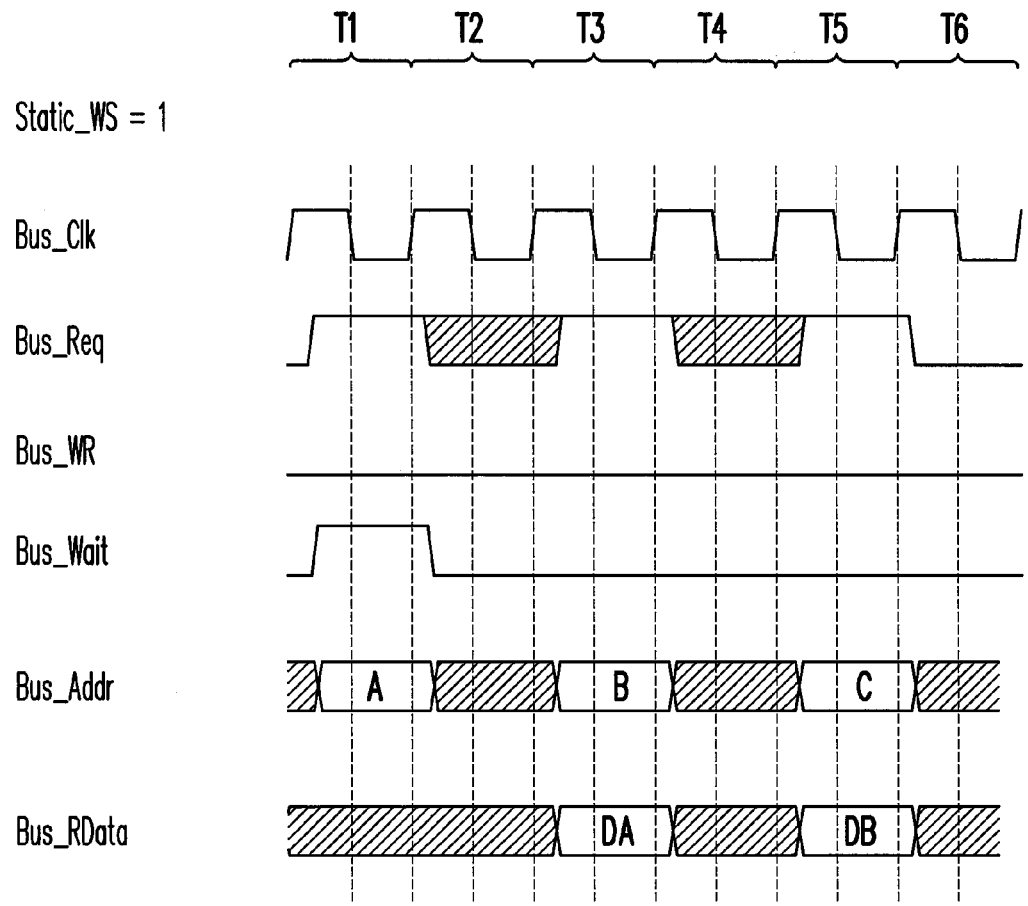

FIG. 7 is another schematic diagram showing signal waveforms in the bus apparatus 500 according to an embodiment of the present invention. In FIG. 7, the bus master 110 issues three read transactions A, B and C, while DA and DB are the read data in response to the read transactions A and B, respectively. In this embodiment, the value of the static wait state signal Static_WS is one. Therefore, the time the bus slave 120 takes to respond to each read transaction is extended by one clock cycle. The bus master 110 can only issue a bus transaction every two clock cycles. The bus slave 120 asserts the bus wait signal Bus_Wait in the clock cycle T1 and then de-asserts the bus wait signal Bus_Wait in the clock cycle T2. However, since the bus slave 120 de-asserts the bus wait signal Bus_Wait in the last clock cycle of the length of time the bus slave 120 takes to respond to the read transaction A, the bus wait signal Bus_Wait has no effect on the read transaction A.

Figure 8:
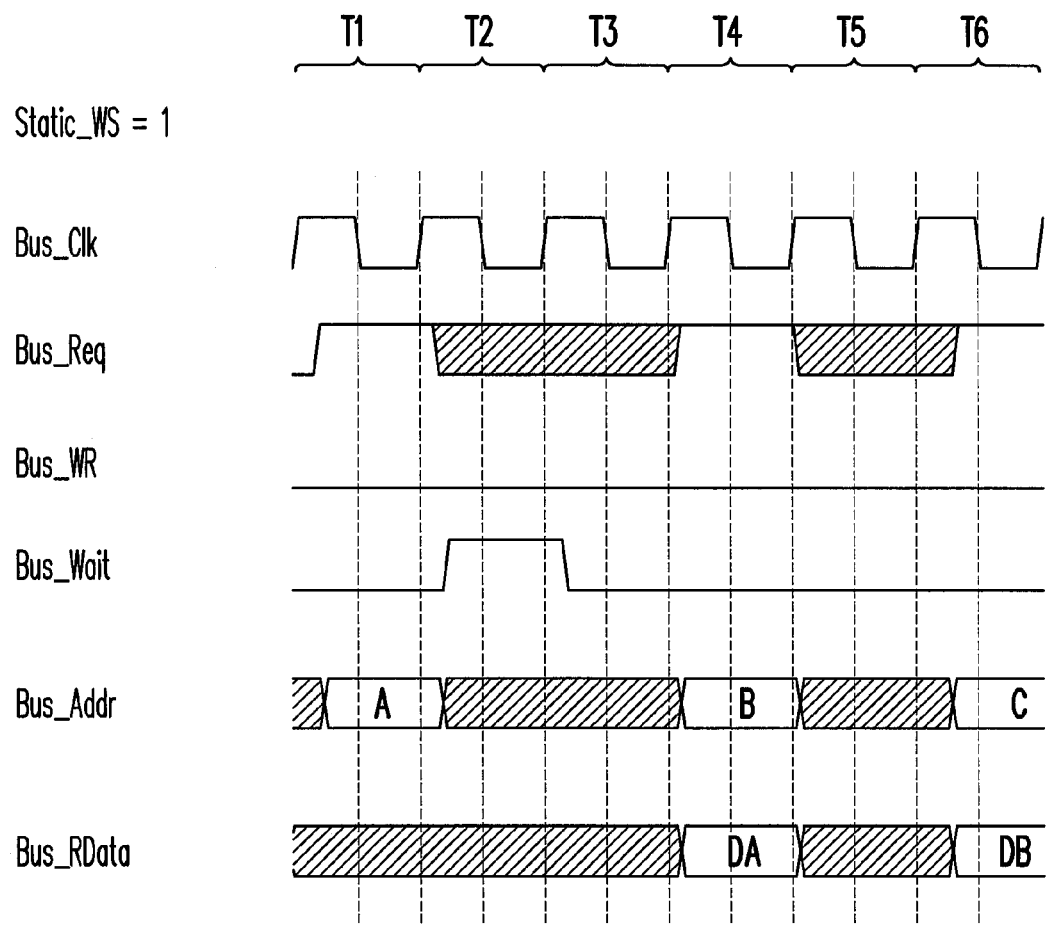

FIG. 8 is another schematic diagram showing signal waveforms in the bus apparatus 500 according to an embodiment of the present invention. In this embodiment, the value of the static wait state signal Static_WS is one. The bus slave 120 asserts the bus wait signal Bus_Wait in the clock cycle T2 and then de-asserts the bus wait signal Bus_Wait in the clock cycle T3. Since the bus slave 120 asserts the bus wait signal Bus_Wait in the length of time the bus slave 120 takes to respond the read transaction A, the time the bus slave 120 takes to respond the read transaction A is further extended until the clock cycle T3 in which the bus slave 120 de-asserts the bus wait signal Bus_Wait. As a result, the bus slave 120 responds the read transaction A with the read data DA in the clock cycle T4. The bus master 110 postpones the next bus transaction B to the clock cycle T4 in response to the assertion and de-assertion of the bus wait signal Bus_Wait.

Figure 9:
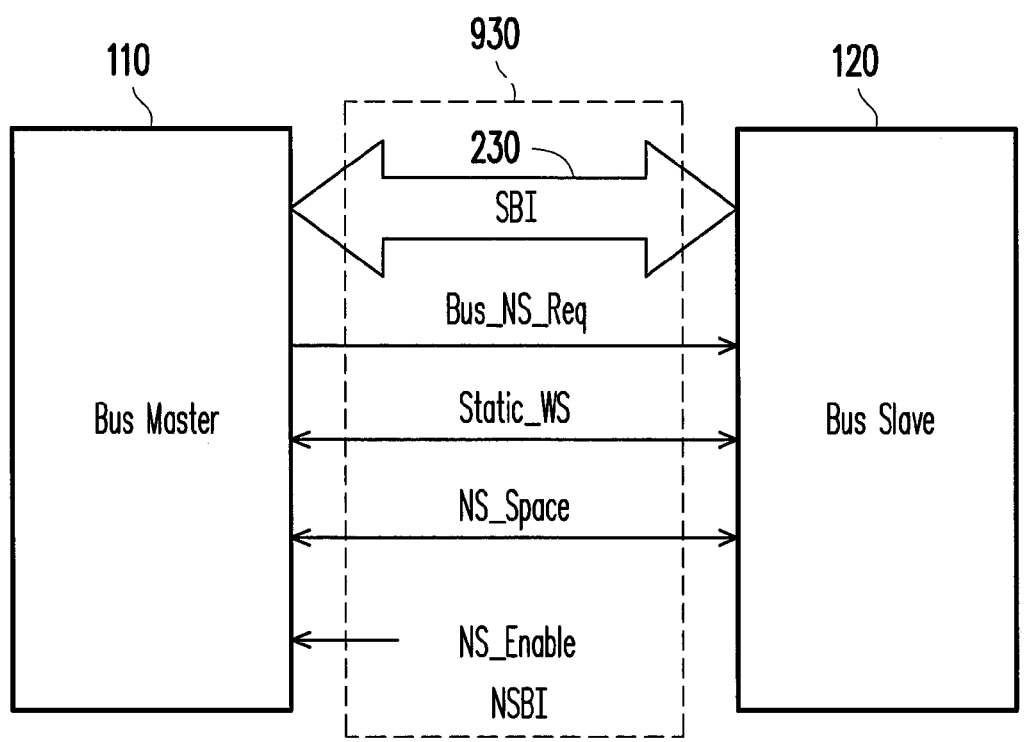
FIG. 9 is a schematic diagram showing a bus apparatus with a Non-Speculative/Speculative Bus Interface (NSBI) according to an embodiment of the present invention.

FIG. 9 is a schematic diagram showing a bus apparatus 900 according to an embodiment of the present invention. The bus apparatus 900 includes the bus master 110 and the bus slave 120. The bus master 110 and the bus slave 120 are coupled to each other through the NSBI 930. The NSBI 930 includes the SBI 230 and all of the bus signals shown in FIG. 2. In addition, each of the bus master 110 and the bus slave 120 receives the static wait state signal Static_WS and a non-speculative space signal NS_Space from the NSBI 930. The bus master 110 receives a non-speculative enable signal NS_Enable from the NSBI 930. The bus master 110 transmits a non-speculative request signal Bus_NS_Req through the NSBI 930 to the bus slave 120.

The additional signals NS_Enable, NS_Space and Bus_NS_Req are for supporting non-speculative bus transactions. In this embodiment, some or all of the memory addresses mapped to the bus slave 120 support non-speculative bus transactions only. In other words, each of those non-speculative memory addresses can only be accessed exactly once for writing data or reading data corresponding to each internal operation of the bus master 110. Such bus slaves are called non-speculative bus slaves hereinafter. A bus transaction addressing a non-speculative memory address is a non-speculative bus transaction.

When the bus master 110 sends a bus transaction to the bus slave 120, the bus master 110 and the bus slave 120 determine whether the bus transaction is speculative or non-speculative according to the non-speculative space signal NS_Space and the address Bus_Addr of the bus transaction. The bus master 110 and the bus slave 120 use the same method for the aforementioned speculative/non-speculative determination, which is decoding the bus address signal Bus_Addr and comparing the result of the decoding with the value of the non-speculative space signal NS_Space. In this embodiment, the bus master 110 and the bus slave 120 compare some predetermined bits (such as the two or the four most significant bits) of the bus address signal Bus_Addr to the value of the non-speculative space signal NS_Space. When the value of the predetermined bits of the bus address signal Bus_Addr is equal to the value of the non-speculative space signal NS_Space, the bus transaction is non-speculative. Otherwise, the bus transaction is speculative.

The non-speculative enable signal NS_Enable may be provided to the bus master 110 to disable the determination of non-speculative transactions. When there is at least one non-speculative bus slave attached to the NSBI 930, the non-speculative enable signal NS_Enable is always asserted. In this case, the bus master and the non-speculative bus slave determine whether each bus transaction is speculative or non-speculative according to the method above. When there is no non-speculative bus slave attached to the NSBI 930, the non-speculative enable signal NS_Enable is always de-asserted. In this case, the bus master and the bus slave simply treat all bus transactions as speculative transactions.

When the bus slave 120 determines that the bus transaction is non-speculative, the bus slave 120 suspends the execution of the bus transaction until notified by the bus master 110 to commit or abort the bus transaction. When the bus master 110 determines that the bus transaction is non-speculative, the bus master 110 withholds the aforementioned notification until the final resolution of the corresponding internal operation. When the bus master 110 determines that the bus transaction is non-speculative and then confirms the execution of the corresponding internal operation, the bus master 110 notifies the bus slave 120 to commit the bus transaction by asserting the non-speculative request signal Bus_NS_Req. In response, the bus slave 120 stores the write data Bus_WData or returns the read data Bus_RData to the bus master 110. When the bus master 110 determines that the bus transaction is non-speculative and then cancels the corresponding internal operation for reasons such as incorrect speculation or pipeline flushing, the bus master 110 notifies the bus slave 120 to abort the bus transaction by sending another bus transaction to the bus slave 120 without notifying the bus slave 120 to commit the bus transaction. In response, the bus slave 120 aborts the bus transaction. The write data Bus_WData is not stored and the read data Bus_RData is not output to the bus master 110.

Figure 10:
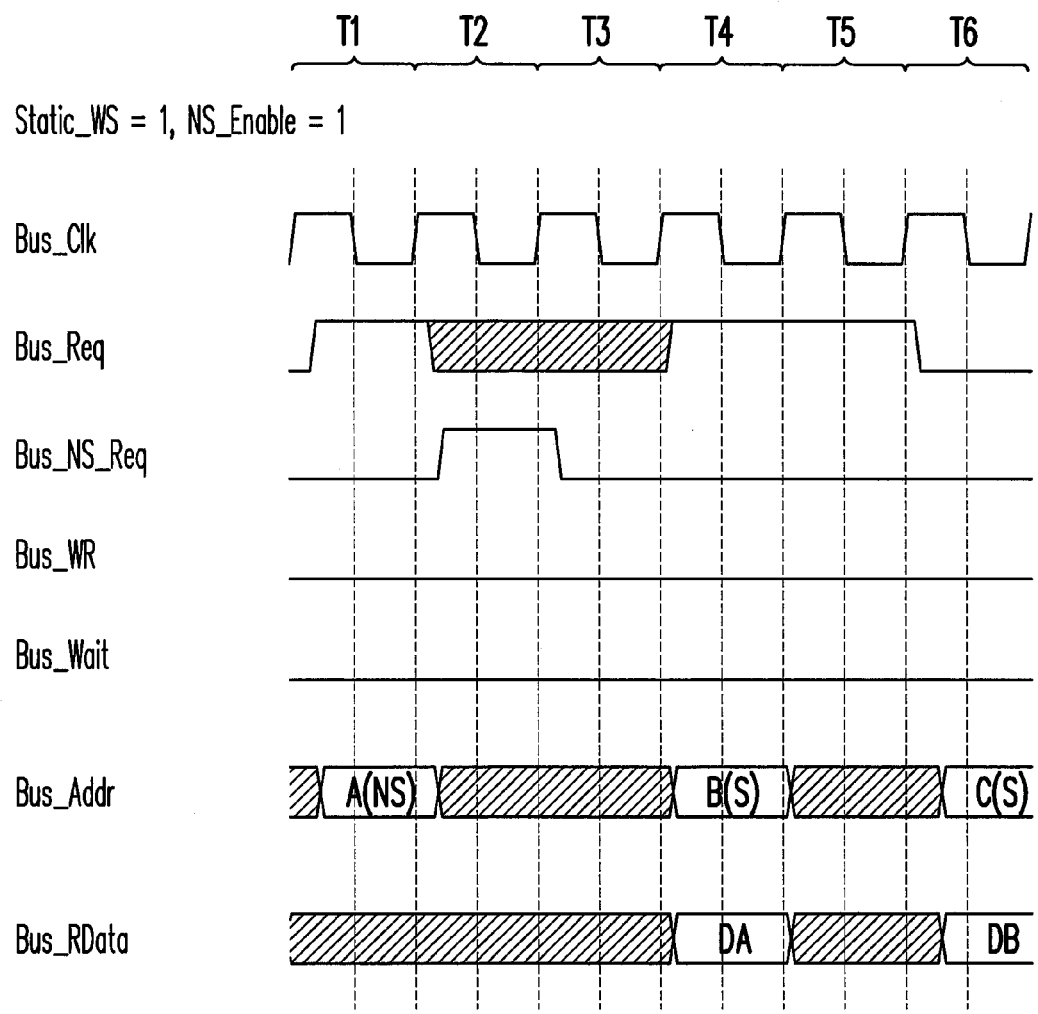
FIG. 10, FIG. 11 and FIG. 12 are schematic diagrams showing signal waveforms in the bus apparatus shown in FIG. 9.

FIG. 10 is a schematic diagram showing signal waveforms in the bus apparatus 900 according to an embodiment of the present invention. In this embodiment, the value of the static wait state signal Static_WS is one and the non-speculative enable signal NS_Enable is asserted. The read transaction A is non-speculative, while the read transactions B and C are speculative. The wait state in the clock cycle T2 of transaction A is induced because transaction A is non-speculative and the bus master 110 needs time to confirm the corresponding internal operation. The wait state in the clock cycle T3 of transaction A is induced because the non-speculative request signal Bus_NS_Req is asserted and the value of the static wait state signal Static_WS is one. The bus slave 120 begins to execute the bus transaction A only after the bus master 110 asserts the non-speculative request signal Bus_NS_Req in the clock cycle T2. For the execution of the bus transaction A, the assertion of the non-speculative request signal Bus_NS_Req is equivalent to the assertion of the bus request signal Bus_Req. Therefore, the static wait state signal Static_WS determines the length of time from the assertion of the non-speculative request signal Bus_NS_Req to the completion of the bus transaction A. The bus slave 120 returns the read data Bus_RData to the bus master 110 in the clock cycle T4.

Figure 11:
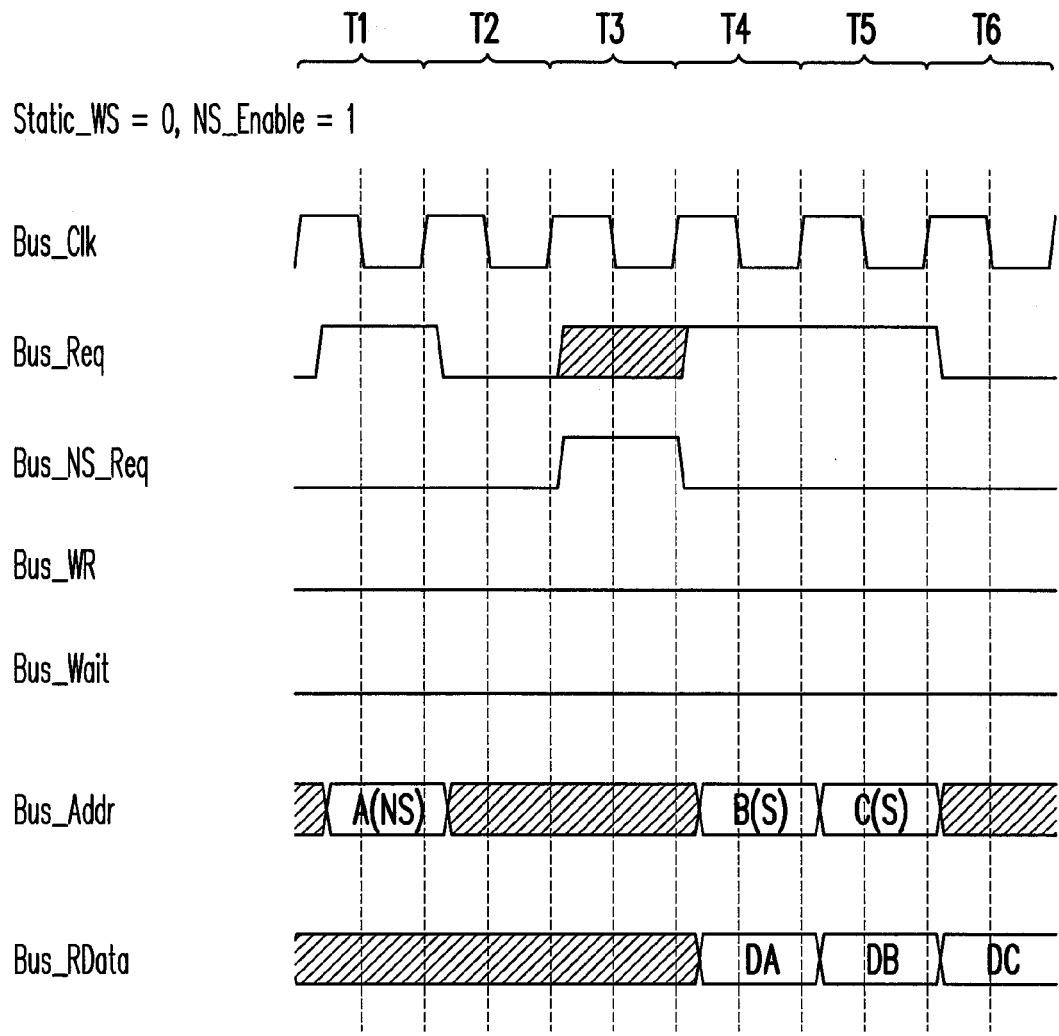

FIG. 11 is a schematic diagram showing signal waveforms in the bus apparatus 900 according to an embodiment of the present invention. In this embodiment, the value of the static wait state signal Static_WS is zero and the non-speculative enable signal NS_Enable is asserted. The read transaction A is non-speculative, while the read transactions B and C are speculative. For the non-speculative bus transaction A, the bus master 110 has to de-assert the bus request signal Bus_Req in the clock cycle T2 next to its first assertion of the bus request signal Bus_Req in the clock cycle T1 since the non-speculative request signal Bus_NS_Req is not to be asserted in the clock cycle T2. Otherwise, the bus slave 120 would recognize the second assertion of the bus request signal Bus_Req in the clock cycle T2 as the issuance of the next bus transaction and a notification to abort the bus transaction A. Because the bus master 110 asserts the non-speculative request signal Bus_NS_Req in the clock cycle T3 and the static wait state signal Static_WS does not extend the response time of the bus slave 120, the bus slave 120 outputs the read data DA in the next clock cycle T4.

Figure 12:
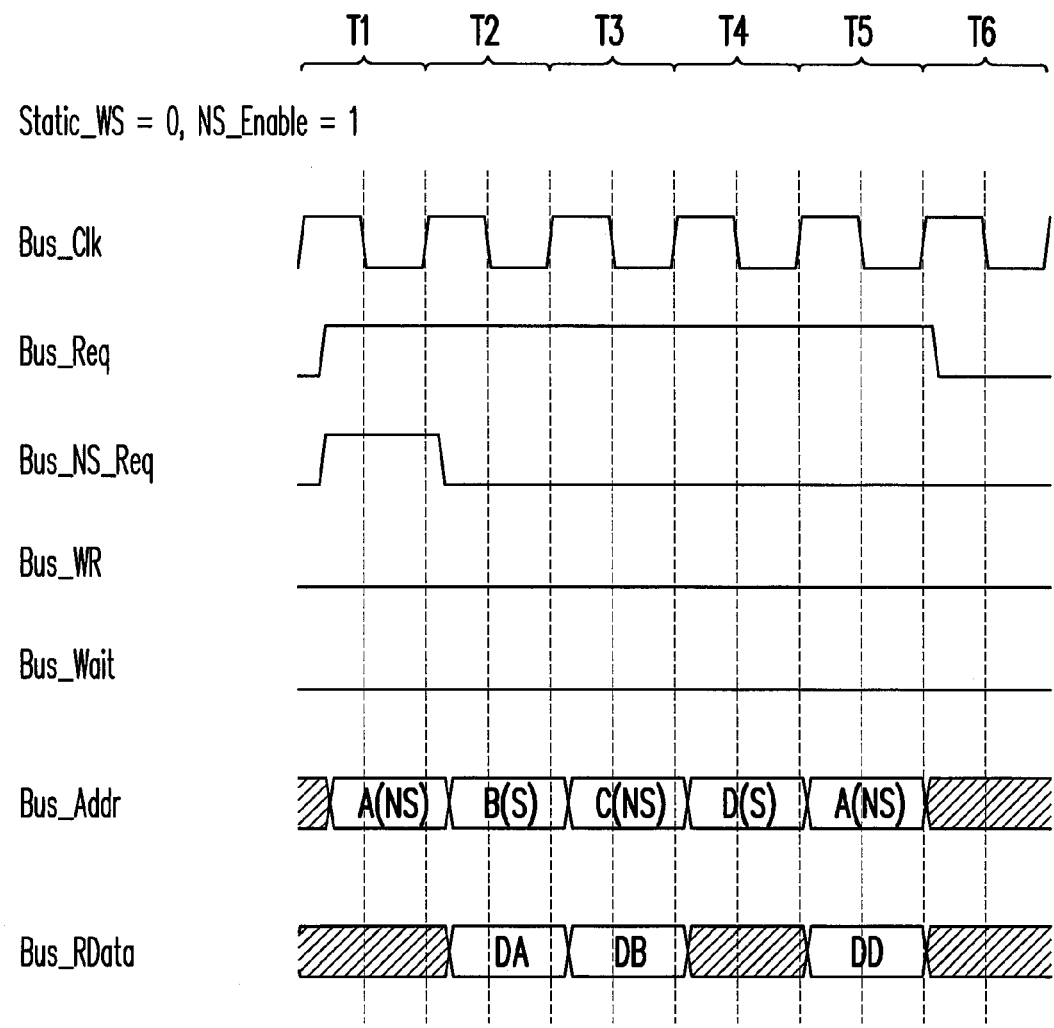

FIG. 12 is a schematic diagram showing signal waveforms in the bus apparatus 900 according to an embodiment of the present invention. In this embodiment, the value of the static wait state signal Static_WS is zero and the non-speculative enable signal NS_Enable is asserted. The read transactions A and C are non-speculative, while the read transactions B and D are speculative. The bus master 110 asserts both the bus request signal Bus_Req and the non-speculative request signal Bus_NS_Req at the same clock cycle T1 to notify the bus slave 120 to commit the bus transaction A immediately. In response, the bus slave 120 outputs the read data DA in the next clock cycle T2. In the clock cycle T4, the bus master 110 notify the bus slave 120 to abort the non-speculative bus transaction C by asserting the bus request signal Bus_Req for the next transaction D without asserting the non-speculative request signal Bus_NS_Req. Therefore, no data is returned from the bus slave 120 to the bus master 110 for the bus transaction C.

In some embodiments of the present invention, the bus master 110 or the bus slave 120 may not support the non-speculative request signal Bus_NS_Req. In those embodiments, when the bus master 110 determine that the bus transaction is non-speculative according to the non-speculative space signal NS_Space and the address Bus_Addr of the bus transaction, the bus master 110 has to suspend sending the bus transaction to the slave 120 until the internal operation of the bus master 110 which induces the bus transaction is to be committed.

Figure 13:
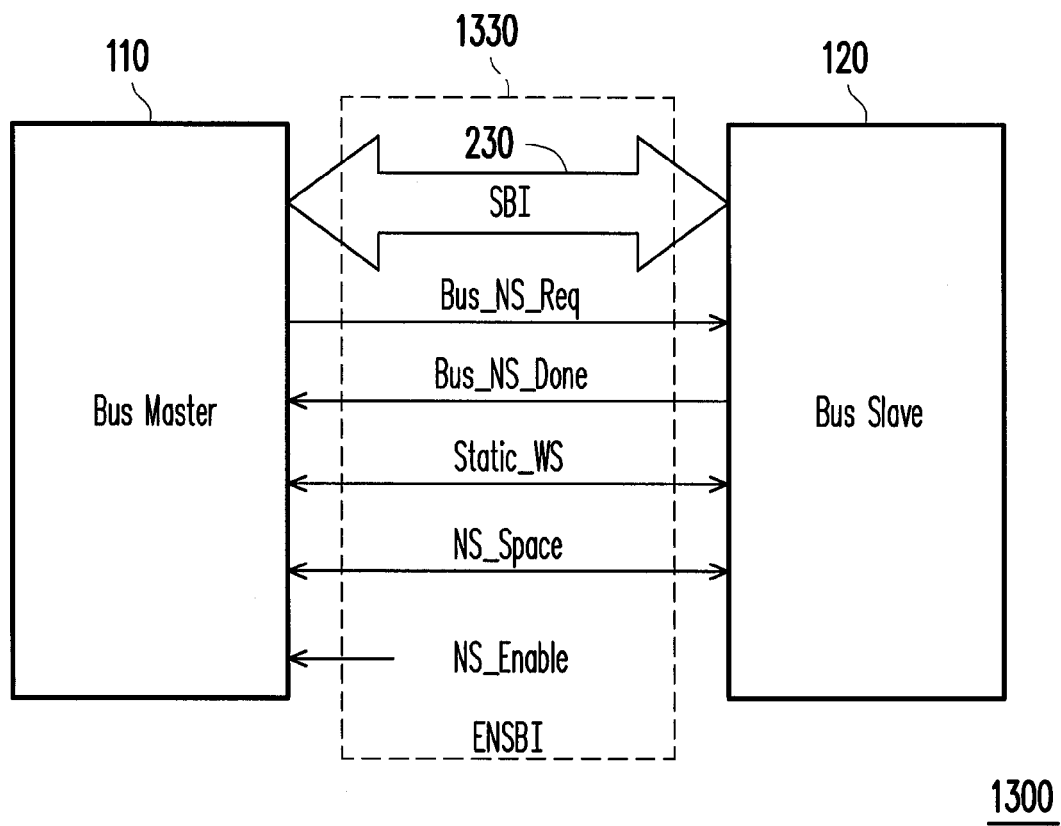
FIG. 13 is a schematic diagram showing a bus apparatus with an Extended Non-speculative/Speculative Bus Interface (ENSBI) according to an embodiment of the present invention.

FIG. 13 is a schematic diagram showing a bus apparatus 1300 according to an embodiment of the present invention. The bus apparatus 1300 includes the bus master 110 and the bus slave 120. The bus master 110 and the bus slave 120 are coupled to each other through the ENSBI 1330. The ENSBI 1330 is an extension of the NSBI 930 shown in FIG. 9, with an additional non-speculative done signal Bus_NS_Done. The bus slave 120 transmits the non-speculative done signal Bus_NS_Done to the bus master 110 through the ENSBI 1330.

In some circumstances, the bus slave 120 may support a speculative memory address in a segment of non-speculative memory addresses. For example, a memory space may be mapped to a plurality of accessible registers of the bus slave 120. Most of the registers support non-speculative accesses only, while some of the registers support speculative accesses. There may be a situation that the bus slave 120 determines that the bus transaction is non-speculative initially and after further decoding of the bus address signal Bus_Addr finds out that the bus transaction is in fact speculative. In this case, the bus slave 120 may commit the bus transaction directly and notify the bus master 110 by asserting the non-speculative done signal Bus_NS_Done to inform the bus master 110 of the commitment of the bus transaction so that the bus master 110 may continue to perform the following internal operations to improve the efficiency of the bus system.

Figure 14:
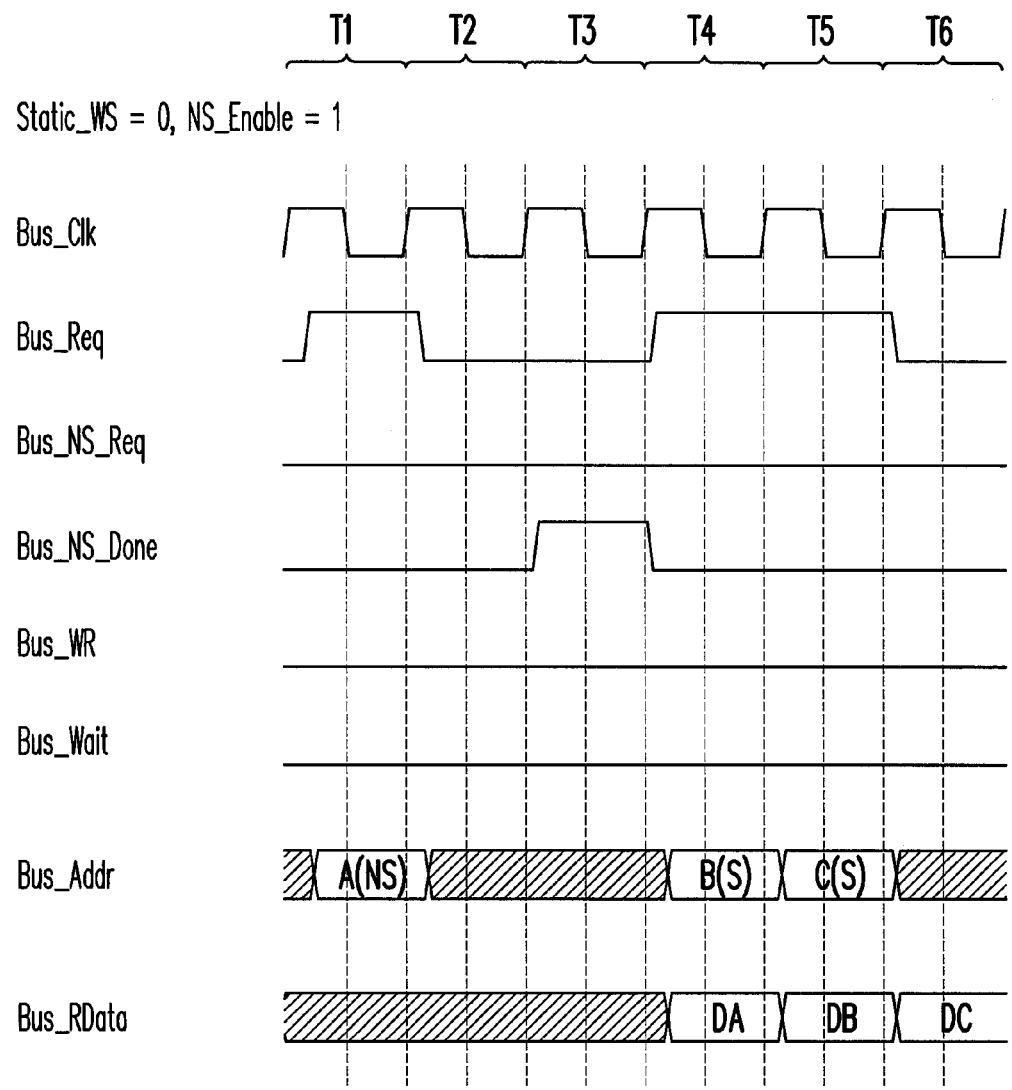
FIG. 14 is a schematic diagram showing signal waveforms in the bus apparatus shown in FIG. 13.

FIG. 14 is a schematic diagram showing signal waveforms in the bus apparatus 1300 according to an embodiment of the present invention. In this embodiment, the value of the static wait state signal Static_WS is zero and the non-speculative enable signal NS_Enable is asserted. The bus master 110 and the bus slave 120 determine that the read transaction A is non-speculative at first, while the read transactions B and C are speculative. Before the bus master 110 asserts the non-speculative request signal Bus_NS_Req, the bus slave 120 finds out that the read transaction A is in fact speculative. Therefore, the bus slave 120 commits the read transaction A, notifies the bus master 110 by asserting the non-speculative done signal Bus_NS_Done in the clock cycle T3, and returns the read data DA to the bus master 110 in the clock cycle T4.

In this embodiment, the bus slave 120 begins to execute the bus transaction A only after the assertion of the non-speculative done signal Bus_NS_Done. For the execution of the bus transaction A, the assertion of the non-speculative done signal Bus_NS_Done is equivalent to the assertion of the bus request signal Bus_Req. Therefore, the static wait state signal Static_WS determines the length of time from the assertion of the non-speculative done signal Bus_NS_Done to the completion of the bus transaction A. The bus slave 120 returns the read data DA to the bus master 110 in the clock cycle T4, which is the next clock cycle after the assertion of the non-speculative done signal Bus_NS_Done. In another embodiment of the present invention, the bus slave 120 may be more aggressive and return the read data DA to the bus master 110 in the clock cycle T3, the same clock cycle in which the bus slave 120 asserts the non-speculative done signal Bus_NS_Done.

Figure 15:
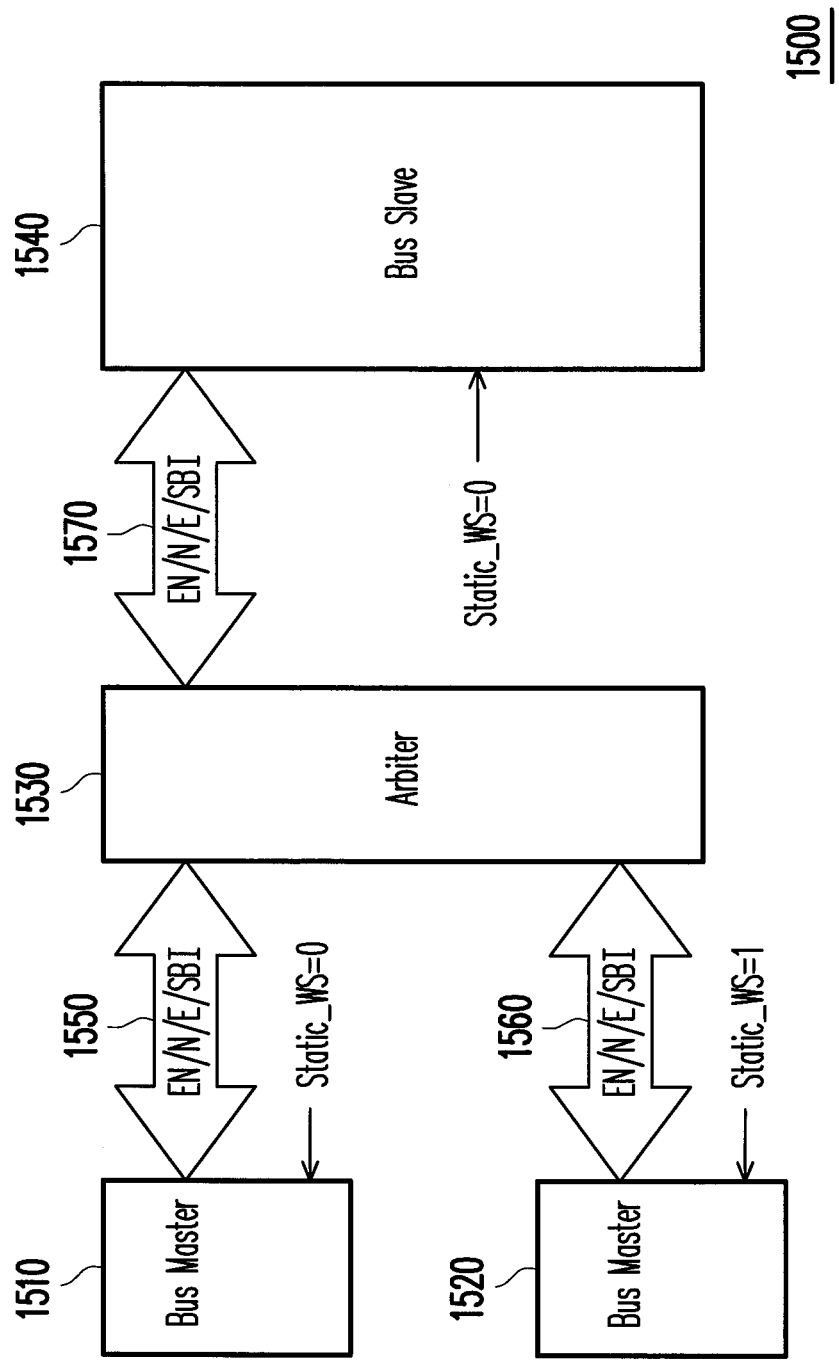
FIG. 15 is a schematic diagram showing a bus apparatus with an arbiter according to an embodiment of the present invention.

FIG. 15 is a schematic diagram showing a bus apparatus 1500 according to an embodiment of the present invention. The bus apparatus 1500 includes two bus masters 1510, 1520, an arbiter 1530 and a bus slave 1540. The bus master 1510 and the arbiter 1530 are coupled to each other through the bus interface 1550. The bus master 1520 and the arbiter 1530 are coupled to each other through the bus interface 1560. The arbiter 1530 and the bus slave 1540 are coupled to each other through the bus interface 1570. Each of the bus interfaces 1550, 1560 and 1570 may be the SBI 230 shown in FIG. 2, the ESBI 530 shown in FIG. 5, the NSBI 930 shown in FIG. 9, or the ENSBI 1330 shown in FIG. 13. The bus interfaces 1550, 1560 and 1570 may be the same type. Alternatively, the bus interfaces 1550, 1560 and 1570 may be different types.

The bus apparatus 1500 features bus arbitration between multiple bus masters. The arbiter 1530 may connect one of the bus masters 1510 and 1520 to the bus slave 1540. The arbiter 1530 forwards all signals transmitted by the connected bus master to the bus slave 1540 and forwards all signals transmitted by the bus slave 1540 to the connected bus master. The issuance of bus transactions, the execution of bus transactions, and the corresponding exchange of bus signals between the connected bus master and the bus slave are the same as their counterparts in the previous embodiments of the present invention, except the differences discussed below.

The two bus masters 1510 and 1520 may issue bus transactions at the same time. The arbiter 1530 has to arrange a sequence of the bus transactions from different bus masters in order to avoid conflict. For this purpose, the arbiter 1530 transmits a static wait state signal Static_WS to each of the bus masters 1510 and 1520. To the bus masters 1510 and 1520, the meaning of the signal Static_WS is the same as its counterpart in the previous embodiments of the present invention, except that the signal Static_WS is from the arbiter 1530 instead of the bus slave 1540 in this embodiment. The static wait state signal Static_WS determines the length of time the corresponding bus master holds the command Bus_WR and the address Bus_Addr of the bus transaction unchanged for the bus slave 1540 to receive the command and the address. When the bus transaction is a write transaction, the static wait state signal Static_WS also determines the length of time the corresponding bus master holds the write data Bus_WData of the bus transaction unchanged for the bus slave 1540 to receive the write data. When the bus transaction is a read transaction, the static wait state signal Static_WS also determines when the corresponding bus master expects to receive the read data Bus_RData output by the bus slave 1540.

In this embodiment, the priority of the bus master 1510 is higher than that of the bus master 1520. When the two bus masters issue bus transactions simultaneously, the arbiter 1530 forwards the bus transaction of the bus master 1510 to the bus slave 1540 first. The bus master 1520 has to wait for the bus master 1510. In order to achieve the aforementioned timing, the arbiter 1530 increases the value of the static wait state signal Static_WS of the bus master 1520 by one so that, by default, the bus transaction of the bus master 1520 is extended by one more clock cycle than the bus transaction of the bus master 1510 is extended. In this embodiment, the value of the signal Static_WS of the bus master 1510 is zero, while the value of the signal Static_WS of the bus master 1520 is one. The arbiter 1530 also transmits a static wait state signal Static_WS to the bus slave 1540. The value of the static wait state signal Static_WS of the bus slave 1540 is zero in this embodiment. In addition, the arbiter 1530 forwards the bus transaction of the bus master 1510 to the bus slave 1540 immediately without delay, while the arbiter 1530 forwards the bus transaction of the bus master 1520 to the bus slave 1540 with a predetermined delay (one clock cycle in this embodiment).

In some other embodiments of the present invention, there may be more bus masters and more bus slaves coupled to the arbiter 1530 through their corresponding bus interfaces. When the aforementioned arbitration scheme is applied to more than two bus masters, the value of the signal Static_WS of the bus master with the highest priory remains unchanged, while the arbiter 1530 increases the value of the signal Static_WS of the other bus masters by one. The arbiter 1530 forwards the bus transaction of the bus master with the highest priority to the bus slave immediately without delay, while the arbiter 1530 forwards the bus transactions of the other bus masters to the bus slaves with the aforementioned predetermined delay. For simplicity, only the two bus masters 1510 and 1520 and the one bus slave 1540 shown in FIG. 15 are involved in the following discussion.

The arbiter 1530 may transmit a bus wait signal Bus_Wait to each of the bus masters 1510 and 1520. As shown in FIG. 2, these bus wait signals are included in the bus interfaces 1550 and 1560. To the bus masters 1510 and 1520, the meaning of the bus wait signal Bus_Wait is the same as their counterparts in the previous embodiments of the present invention, except that they are output by the arbiter 1530 instead of the bus slave 1540. The bus wait signal Bus_Wait informs the corresponding bus master that the arbiter 1530 will not recognize further bus transactions in the specific period of time determined according to the assertion and de-assertion of the bus wait signal Bus_Wait. When the arbiter 1530 asserts the bus wait signal for a bus transaction, no matter the bus transaction is extended by a static wait state signal Static_WS or not, the bus transaction is further extended according to the time when the arbiter 1530 de-asserts the bus wait signal.

Figure 16:
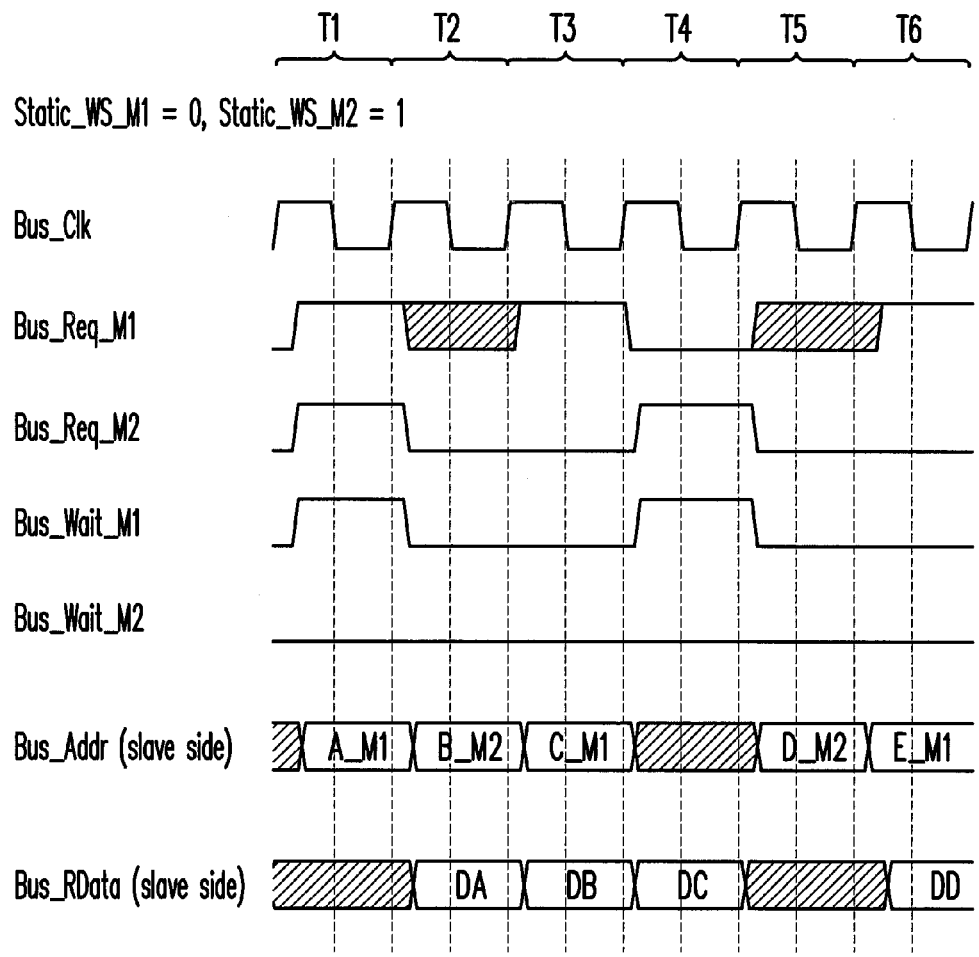
FIG. 16, FIG. 17 and FIG. 18 are schematic diagrams showing signal waveforms in the bus apparatus shown in FIG. 15.
Figure 17:
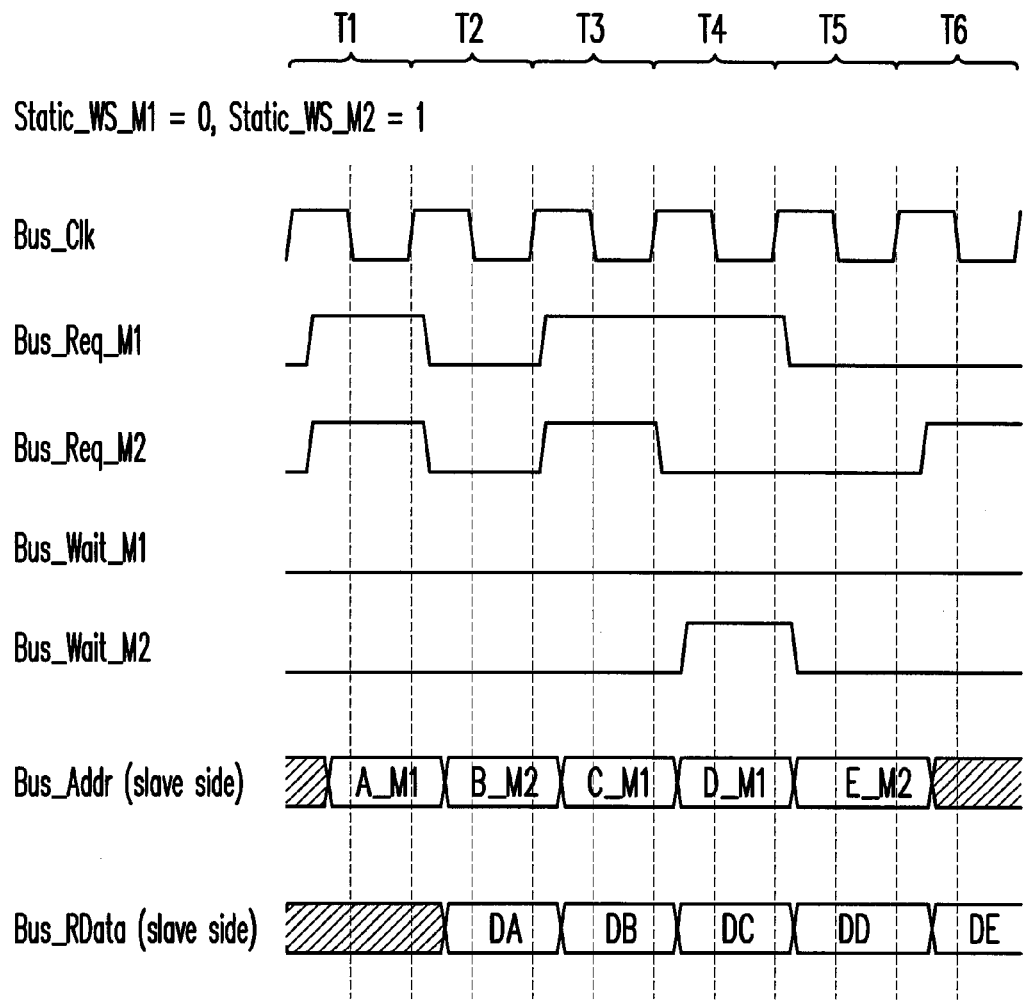
Figure 18:
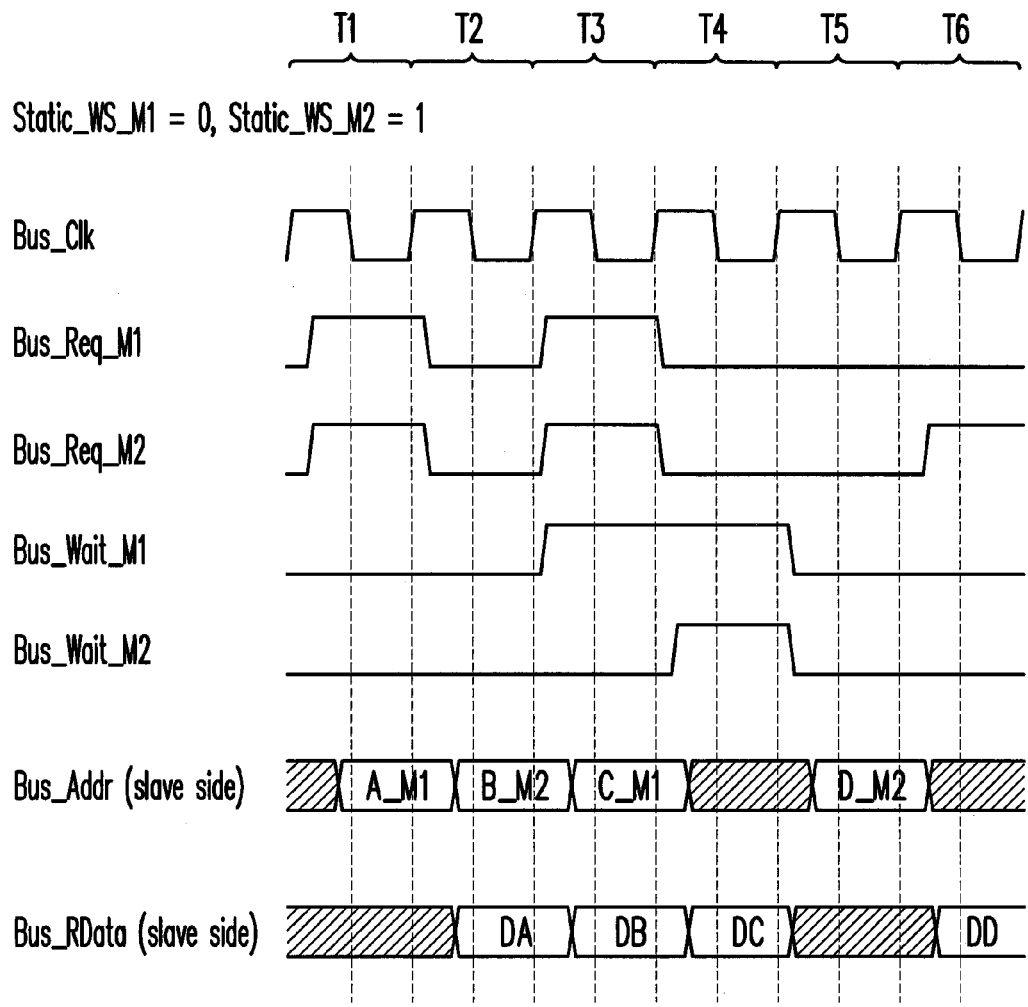

FIG. 16, FIG. 17 and FIG. 18 are schematic diagrams showing signal waveforms in the bus apparatus 1500 according to three embodiments of the present invention. In these three figures, signals with the suffix "_M1" means the signals received or transmitted by the bus master 1510, while signals with the suffix "_M2" means the signals received or transmitted by the bus master 1520. The priority of the bus master 1510 is higher than that of the bus master 1520. "Bus_Addr (slave side)" is the addresses of read transactions issued by the bus masters 1510 and 1520 and forwarded by the arbiter 1530 to the bus interface 1570 coupled to the bus slave 1540. "Bus_RData (slave side)" is the corresponding read data output by the bus slave 1540 to the bus interface 1570.

In the embodiment shown in FIG. 16, whenever the bus master 1520 issues a bus transaction, the arbiter 1530 asserts the bus wait signal Bus_Wait_M1 of the bus master 1510 in the same clock cycle so that the bus master 1510 will not issue another bus transaction in the next clock cycle. In this way, the arbiter 1530 can forward the bus transaction issued by the bus master 1510 to the bus slave 1540 in the current clock cycle and then forward the bus transaction issued by the bus master 1520 to the bus slave 1540 in the next clock cycle without conflict.

Alternatively, the arbiter 1530 may assert the bus wait signal Bus_Wait to either the bus master 1510 or the bus master 1520 in the last clock cycle extended by the static wait state signal Static_WS_M2 of the bus master 1520 to decide who should win the access of the bus slave 1540 when both of the bus masters 1510 and 1520 intend to assert the bus request signal Bus_Req in next clock cycle. In general, this change-of-arbitration process can be done right before the completion of any bus transaction issued by any bus master.

The embodiment of FIG. 17 shows another alternative arbitration policy enforced by the arbiter 1530. In this embodiment, the arbiter 1530 does not assert the bus wait signal Bus_Wait_M1 of the bus master 1510 when the bus master 1520 issues a bus transaction. Instead, the arbiter 1530 asserts the bus wait signal Bus_Wait_M2 of the bus master 1520 whenever the bus master 1510 issues a bus transaction in the length of time of a bus transaction extended by the static wait state signal Static_WS_M2 of the bus master 1520.

For example, the two bus masters issue the bus transactions A_M1 and B_M2 respectively in the same clock cycle T1. The arbiter 1530 forwards the transaction A_M1 to the bus slave 1540 in the clock cycle T1 and then forwards the transaction B_M2 to the bus slave 1540 in the next clock cycle T2. Since the value of the static wait state signal Static_WS_M2 is one, the bus master 1520 expects to receive the read data DB one clock cycle later, which is in accordance with the predetermined delay the arbiter 1530 imposes on the bus master 1520. In the clock cycle T3, the two bus masters issue the bus transactions C_M1 and E_M2 respectively. Moreover, the bus master 1510 issues the bus transaction D_M1 in the next clock cycle T4. The bus transactions D_M1 and E_M2 compete for the bus slave 1540 in the clock cycle T4. In response, the arbiter 1530 asserts the bus wait signal Bus_Wait_M2 in the clock cycle T4 because the bus master 1510 issues the bus transaction D_M1 during the bus transaction E_M2 that is already extended by the static wait state signal Static_WS_M2 of the bus master 1520. As a result, the arbiter 1530 forwards the transaction D_M1 to the bus slave 1540 in the clock cycle T4 and then forwards the transaction E_M2 to the bus slave 1540 in the clock cycle T5. The bus transaction E_M2 is further extended by the bus wait signal Bus_Wait_M2 asserted in the clock cycle T4.

FIG. 18 shows an embodiment of the present invention in which the arbiter 1530 asserts the bus wait signals Bus_Wait_M1 and Bus_Wait_M2 of the two bus masters and then adjust the static wait state signals Static_WS_M1 and Static_WS_M2 of the two bus masters to adjust the aforementioned lengths of time determined by the static wait state signals Static_WS_M1 and Static_WS_M2 of the two bus masters. This adjustment of the signals Static_WS_M1 and Static_WS_M2 is equivalent to adjusting the priorities of the bus masters 1510 and 1520.

In FIG. 18, the arbiter 1530 asserts both the bus wait signals Bus_Wait_M1 and Bus_Wait_M2 in the clock cycle T4 to hold all accesses to the bus slave 1540. Next, the arbiter 1530 switches the values of the static wait state signals Static_WS_M1 and Static_WS_M2 in the clock cycle T5 to exchange the priorities of the bus masters 1510 and 1520. The new priorities take effect in the clock cycle T6. In other words, beginning in the clock cycle T6, the arbiter 1530 forwards bus transactions of the bus master 1520 to the bus slave 1540 immediately without delay and forwards bus transactions of the bus master 1510 to the bus slave 1540 with a predetermined delay.

In summary, the bus interfaces provided in the present invention support speculative bus transactions by default and support non-speculative bus transactions as well. The bus protocols that the bus masters and the bus slaves use in the present invention are very aggressive, which shortens the latency of bus transactions and improves the performance of the bus system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A bus apparatus, comprising:
a bus master; and
a bus slave coupled to the bus master through a bus interface, wherein
when the bus master sends a bus transaction to the bus slave, the bus slave executes the bus transaction, wherein the bus transaction is speculative by default and a command of the bus transaction indicates whether the bus transaction is a write transaction or a read transaction;
when the bus transaction is the write transaction, the bus slave stores a write data of the bus transaction at an address of the bus transaction;
when the bus transaction is the read transaction, the bus slave responds the bus transaction with a read data stored at the address of the bus transaction;
the bus slave informs the bus master that the bus slave will not recognize further bus transactions in a specific period of time by asserting a bus wait signal.
2. The bus apparatus of claim 1, wherein the specific period of time begins at a next clock cycle after the bus slave asserts the bus wait signal and ends at a clock cycle in which the bus slave de-asserts the bus wait signal.
3. The bus apparatus of claim 1, wherein
the bus master and the bus slave receive a static command/address wait state signal, a static write data wait state signal, and a static read data wait state signal;

none of the static command/address wait state signal, the static write data wait state signal, and the static read data wait state signal changes during the bus transaction;
the static command/address wait state signal determines a length of time the bus master holds the command and the address of the bus transaction unchanged for the bus slave to receive the command and the address;
the static write data wait state signal determines a length of time the bus master holds the write data of the bus transaction unchanged for the bus slave to receive the write data;
the static read data wait state signal determines a length of time the bus slave takes to respond the read transaction with the read data;
the static command/address wait state signal, the static write data wait state signal, and the static read data wait state signal are three separate signals or are unified into a single static wait state signal.

4. The bus apparatus of claim 1, wherein
when the bus slave asserts the bus wait signal in a length of time the bus master holds the command and the address of the bus transaction unchanged for the bus slave to receive the command and the address, the length of time the bus master holds the command and the address of the bus transaction unchanged is extended according to a time when the bus slave de-asserts the bus wait signal;
when the bus slave asserts the bus wait signal in a length of time the bus master holds the write data of the bus transaction unchanged for the bus slave to receive the write data, the length of time the bus master holds the write data of the bus transaction unchanged is extended according to a time when the bus slave de-asserts the bus wait signal;
when the bus slave asserts the bus wait signal in a length of time the bus slave takes to respond the read transaction with the read data, the length of time the bus slave takes to respond the read transaction with the read data is extended according to a time when the bus slave de-asserts the bus wait signal.

5. The bus apparatus of claim 1, wherein
the bus master and the bus slave receive a non-speculative space signal;
the bus master and the bus slave determine whether the bus transaction is speculative or non-speculative according to the non-speculative space signal and the address of the bus transaction;
when the bus transaction is non-speculative, the bus slave suspends the execution of the bus transaction until notified by the bus master to commit or abort the bus transaction.

6. The bus apparatus of claim 1, wherein
the bus master and the bus slave receive a non-speculative space signal;
the bus master and the bus slave determine whether the bus transaction is speculative or non-speculative according to the non-speculative space signal and the address of the bus transaction;
when the bus transaction is non-speculative, the bus master suspends sending the bus transaction to the slave until an internal operation of the bus master which induces the bus transaction is to be committed.

7. The bus apparatus of claim 3, wherein
the static command/address wait state signal extends the length of time the bus master holds the command and the address of the bus transaction unchanged by a number of cycles of a bus clock signal equal to a value of the static command/address wait state signal;
the static write data wait state signal extends the length of time the bus master holds the write data of the bus transaction unchanged by a number of cycles of the bus clock signal equal to a value of the static write data wait state signal;
the static read data wait state signal extends the length of time the bus slave takes to respond the read transaction with the read data by a number of cycles of the bus clock signal equal to a value of the static read data wait state signal.

8. The bus apparatus of claim 4, wherein
the length of time the bus master holds the command and the address of the bus transaction unchanged, the length of time the bus master holds the write data of the bus transaction unchanged, and the length of time the bus slave takes to respond the read transaction with the read data are extended until a cycle of the bus clock signal in which the bus slave de-asserts the bus wait signal.

9. The bus apparatus of claim 5, wherein
when the bus transaction is non-speculative, the bus master notifies the bus slave to commit the bus transaction by asserting a non-speculative request signal;
when the bus transaction is non-speculative, the bus master notifies the bus slave to abort the bus transaction by sending another bus transaction to the bus slave without notifying the bus slave to commit the bus transaction.

10. The bus apparatus of claim 7, wherein
the bus slave further transmits at least one of a dynamic command/address wait state signal, a dynamic write data wait state signal, and a dynamic read data wait state signal through the bus interface to the bus master;
when the bus slave asserts the dynamic command/address wait state signal in the length of time the bus master holds the command and the address of the bus transaction unchanged, the length of time the bus master holds the command and the address of the bus transaction unchanged is further extended according to a time when the bus slave de-asserts the dynamic command/address wait state signal;
when the bus slave asserts the dynamic write data wait state signal in the length of time the bus master holds the write data of the bus transaction unchanged, the length of time the bus master holds the write data of the bus transaction unchanged is further extended according to a time when the bus slave de-asserts the dynamic write data wait state signal;
when the bus slave asserts the dynamic read data wait state signal in the length of time the bus slave takes to respond the read transaction with the read data, the length of time the bus slave takes to respond the read transaction with the read data is further extended according to a time when the bus slave de-asserts the dynamic read data wait state signal.

11. The bus apparatus of claim 9, wherein when the bus slave determines that the bus transaction is non-speculative initially and then finds out that the bus transaction is speculative, the bus slave commits the bus transaction and notifies the bus master that the bus transaction is committed.

12. The bus apparatus of claim 10, wherein
the length of time the bus master holds the command and the address of the bus transaction unchanged is further extended until a cycle of the bus clock signal in which the bus slave de-asserts the dynamic command/address wait state signal;
the length of time the bus master holds the write data of the bus transaction unchanged is further extended until a cycle of the bus clock signal in which the bus slave de-asserts the dynamic write data wait state signal;

the length of time the bus slave takes to respond the read transaction with the read data is further extended until a cycle of the bus clock signal in which the bus slave de-asserts the dynamic read data wait state signal.

13. A bus apparatus, comprising:

an arbiter;

a first bus master coupled to the arbiter through a first bus interface;

a second bus master coupled to the arbiter through a second bus interface; and a bus slave coupled to the arbiter through a third bus interface, wherein for each bus master of the first and the second bus masters, when the bus master issues a bus transaction, the arbiter forwards the bus transaction to the bus slave and the bus slave executes the bus transaction, wherein the bus transaction is speculative by default and a command of the bus transaction indicates whether the bus transaction is a write transaction or a read transaction;

when the bus transaction is the write transaction, the bus slave stores a write data of the bus transaction at an address of the bus transaction;

when the bus transaction is the read transaction, the bus slave responds the bus transaction with a read data stored at the address of the bus transaction and the arbiter forwards the read data to the bus master;

the arbiter transmits a static wait state signal to the bus master, wherein the static wait state signal determines a length of time the bus master holds the command and the address of the bus transaction unchanged for the bus slave to receive the command and the address;

when the bus transaction is the write transaction, the bus master also holds the write data of the bus transaction unchanged for the bus slave to receive the write data according to the length of time;

the length of time determined by the static wait state signal of the second bus master is longer than the length of time determined by the static wait state signal of the first bus master by default;

the arbiter forwards the bus transaction of the first bus master to the bus slave immediately without delay, while the arbiter forwards the bus transaction of the second bus master to the bus slave with a predetermined delay.

14. The bus apparatus of claim 13, wherein the arbiter informs the bus master that the arbiter will not recognize further bus transactions in a specific period of time by asserting a bus wait signal;

when the second bus master issues the bus transaction, the arbiter asserts the bus wait signal of the first bus master.

15. The bus apparatus of claim 13, wherein for each bus master of the first and the second bus masters, the arbiter further transmits a bus wait signal to the bus master;

when the arbiter asserts the bus wait signal in the length of time determined by the static wait state signal, the length of time is extended according to a time when the arbiter de-asserts the bus wait signal;

when the first bus master issues the bus transaction in the length of time determined by the static wait state signal of the second bus master, the arbiter asserts the bus wait signal of the second bus master.

16. The bus apparatus of claim 15, wherein the arbiter asserts the bus wait signals of the first and the second bus masters and then adjust the static wait state signals of the first and the second bus masters to adjust the lengths of time determined by the static wait state signals of the first and the second bus masters.

* * * * *